United States Patent
Büppelmann

(10) Patent No.: US 6,556,831 B1
(45) Date of Patent: Apr. 29, 2003

(54) TELECOMMUNICATION SYSTEM

(75) Inventor: Ralf Büppelmann, Munich (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/350,372

(22) Filed: Jul. 9, 1999

(30) Foreign Application Priority Data

Jul. 10, 1998 (DE) .......................................... 198 31 086

(51) Int. Cl.⁷ ................................................ H04Q 7/20
(52) U.S. Cl. ...................... 455/456; 455/422; 455/403
(58) Field of Search ................................ 455/456, 432, 455/440, 457, 414, 422, 403, 67.1, 450, 435; 340/988, 990, 995

(56) References Cited

U.S. PATENT DOCUMENTS

| | | | |
|---|---|---|---|
| 4,907,290 A | | 3/1990 | Crompton |
| 5,119,504 A | | 6/1992 | Durboraw, III |
| 5,153,902 A | | 10/1992 | Buhl et al. |
| 5,369,681 A | * | 11/1994 | Boudreau et al. .......... 340/7.25 |
| 5,369,684 A | * | 11/1994 | Buhl et al. ................... 455/453 |
| 5,500,887 A | | 3/1996 | Jeon et al. |
| 5,502,758 A | | 3/1996 | Tsuzuki et al. |
| 5,539,924 A | | 7/1996 | Grube et al. |
| 5,546,445 A | | 8/1996 | Dennison et al. |
| 5,577,264 A | | 11/1996 | Tuohino |
| 5,579,375 A | | 11/1996 | Ginter |
| 5,606,596 A | | 2/1997 | Jain et al. |
| 5,625,668 A | | 4/1997 | Loomis et al. |
| 5,712,899 A | * | 1/1998 | Pace, II ...................... 455/456 |
| 5,918,159 A | * | 6/1999 | Fomukong et al. ......... 455/456 |
| 5,950,137 A | * | 9/1999 | Kim ............................. 455/456 |
| 6,108,533 A | * | 8/2000 | Brohoff ....................... 455/456 |
| 6,163,701 A | * | 12/2000 | Salch et al. ................. 455/414 |
| 6,195,556 B1 | * | 2/2001 | Reudink et al. ............ 455/456 |
| 6,198,933 B1 | * | 3/2001 | Lundin ....................... 455/456 |
| 6,226,317 B1 | * | 5/2001 | Bruckert et al. ............ 375/146 |

FOREIGN PATENT DOCUMENTS

| | | |
|---|---|---|
| EP | 0536949 A | 4/1993 |
| EP | 0738095 A | 10/1996 |
| EP | 0782352 A | 7/1997 |
| EP | 0905956 A | 3/1999 |
| JP | 2-94827 | 4/1990 |
| WO | WO 96/19891 | 6/1996 |
| WO | WO96/25830 | 8/1996 |
| WO | WO 96/28945 | 9/1996 |
| WO | WO 96/35289 | 11/1996 |
| WO | WO 97/06626 | 2/1997 |
| WO | WO98/19484 | 5/1998 |
| WO | WO98/21911 | 5/1998 |

* cited by examiner

*Primary Examiner*—Dwayne Bost
*Assistant Examiner*—Sonny Trinh

(57) ABSTRACT

A telecommunication system, a method for setting-up a call in a telecommunication system and a switching device in a telecommunication system for providing a call between a first subscriber station and a second subscriber station is disclosed. A second subscriber station sends a request for obtaining location information concerning the first subscriber station to the telecommunication system. Then, location information is extracted from network information already available in the mobile radio telecommunication network to which the first subscriber station is connected by means of a location information extracting device. The extracted location information is provided to the second subscriber station by means of a location information providing device. Since no radio path is established to the first mobile subscriber station in question the resource consumption for providing location information can be minimized.

33 Claims, 6 Drawing Sheets

TELECOMMUNICATION SYSTEM

This application claims priority under 35 U.S.C. §§119 and/or 365 to 198 31 086.2 filed in Federal Republic of Germany on Jul. 10, 1998; the entire content of which is hereby incorporated by reference.

FIELD OF THE INVENTION

The present invention relates to a telecommunication system for providing a call connection between a first subscriber station and a second subscriber station and a method for setting-up a call connection in a telecommunication system between a first subscriber station and a second subscriber station, wherein said first subscriber station is a mobile subscriber station, which is connected to a first mobile radio telecommunication network and said second subscriber station is connected to a telecommunication network connected to said first mobile radio telecommunication network, and switching means of a mobile telecommunication system for providing a call connection between a first subscriber station and a second subscriber station wherein said first subscriber station is a mobile subscriber station which is connected to a first mobile radio telecommunication network and said second subscriber station is connected to a telecommunication network which is connected to said first mobile radio telecommunication network.

BACKGROUND OF THE INVENTION

FIG. 5 shows components of a typical digital cellular telecommunication system according to the standards of the global system for mobile communications GSM. Such a telecommunication system is usually divided into a switching sub-system NSS and a base station sub-system BSS. The switching sub-system NSS comprises a gateway mobile switching center GMSC, a home location register HLR and a plurality of visitor location registers VLRs and mobile switching centers MSCs. For the sake of clarity, only two mobile switching centers MSCs and one visitor location register VLR are depicted. The base station sub-system BSS is constituted by facilities such as radio transceivers and switching centers to link those radio transceivers. The network shown in FIG. 5 is simplified and details on the base station sub-system BSS are omitted for the sake of clarity. To link such a telecommunication system to another telecommunication system there is provided the gateway mobile switching center GMSC that serves to determine the MSC/VLR currently serving a mobile subscriber station MS in the telecommunication system and to route calls towards this mobile subscriber station MS.

To this end, the gateway mobile switching center GMSC is connected to the home location register HLR wherein subscriber information and mobile information to allow incoming calls to be routed to the mobile subscriber station MS are stored. Any administrative action by the network operator with respect to subscriber data is carried out in the home location register HLR.

As can be seen from FIG. 5, the GSM-network comprises a plurality of mobile switching centers MSC each covering a predetermined number of basic cells covering a service area in which a mobile subscriber station MS can move. To this end, each mobile switching center MSC is connected to a visitor location register VLR. When a roaming mobile subscriber station MS enters a service area assigned to a specific mobile switching center MSC, the mobile switching center MSC informs the associated visitor location register VLR about the presence of the mobile subscriber station MS.

To route a call to a mobile subscriber station MS, the gateway mobile switching center GMSC is also connected to the mobile switching center MSC through which the mobile subscriber station MS can obtain a service. The mobile switching center MSC performs the necessary switching functions required for mobile subscriber stations MS covered by this mobile switching center MSC. In particular, the mobile switching center MSC monitors the mobility of its mobile subscriber stations MS and manages necessary resources required to handle and update the location registration updating procedures. Location information concerning the respective mobile subscriber stations MS is available in said mobile switching center MSC and is stored in said visitor location register VLR. The home location register always contains the address of the visitor location register VLR or the mobile switching center assigned to the cell in which the respective mobile subscriber station MS is currently located. If said mobile subscriber station MS is located in another GSM network which is not its home-GSM network, the home location register HLR in the home-GSM network of the mobile subscriber station MS contains an address of said other GSM-network pointing to an HLR of the other network.

The base station sub-system BSS corresponds to a physical equipment providing radio coverage to prescribed geographical areas referred to as cells and shown as hexagonal geographical regions in FIG. 5. Each base station sub-system BSS contains equipment required to communicate with the mobile subscriber stations MS such as a plurality of switching centers (not shown). Functionally, the base station sub-system BSS provides a control function carried out by a base station controller BSC and a transmitting function performed by the base transceiver system BTS (both not shown) The base transceiver system BTS corresponds to a radio transmission equipment that covers each cell. A base station sub-system can serve several cells because it can have multiple base transceiver systems BTS.

DESCRIPTION OF THE PRIOR ART

In a conventional GSM network as shown in FIG. 5 and operating as described above, there is available network information indicating a current location of a mobile subscriber station MS. However, said network information is kept inside the GSM network.

WO 96/25830 discloses a conventional telecommunication system. For determining a position of a mobile subscriber station in a mobile radio telecommunication network in said telecommunication system, the telecommunication system establishes a call connection generated by a position handler. Such a call connection for the determination of the position of a mobile subscriber station is referred to as a simulated call connection. In the simulated call connection, a call connection is established between the position handler and the mobile subscriber station in question. Therefore, a radio path has to be established between the mobile subscriber station in question and the nearest or best suitable Base Transceiver Station serving the area in which the mobile subscriber station in question is momentarily located. The position handler contains mobile subscriber station categories and subscriber stations intended for simulated call connections. The simulated call connection is released when the system has sent a paging message to said mobile station and after said mobile subscriber station has sent a response to this paging message. This response is used to determine the cell in which the mobile subscsriber station is located. A so-called timing advance of a mobile subscriber station can be used to obtain more accurate positioning of said mobile subscriber station in the cell.

U.S. Pat. No. 5,625,668 discloses another conventional telecommunication system providing a polling system to determine the location of a mobile subscriber station. A calling subscriber who requests location information on a mobile subscriber station firstly accesses a database processing facility. This database processing facility accesses the mobile subscriber station through the nearest cellular station. A radio path has to be established between the nearest cellular station and the mobile subscriber station. Then, a current location of the mobile subscriber station is determined by means of a global positioning system GPS arranged in said mobile subscriber station. The location information thereby obtained in transmitted via said radio path to the nearest cellular station and further to said database processing facility which forwards said location information to the requesting subscriber station.

In both conventional telecommunication systems respectively disclosed in WO 96/25830 and U.S. Pat. No. 5,625,668 it is necessary to access the mobile subscriber station in the mobile radio telecommunication network. Accordingly, each time a requesting subscriber station requests location information of a mobile subscriber station, a radio path has to be established between the nearest cellular station and the respective mobile subscriber station in question causing a high signaling load on the radio path. Accordingly, a request for location information concerning a mobile subscriber station has the same resource consumption as a call connection. The term "resource consumptions" relates to the occupation, i.e. the use of means which are necessary to establish a call connection to a mobile subscriber station in a mobile radio telecommunication network. Since the number of radio paths in one cell is limited, the number of calls handled simultaneously in one cell is limited. The number of actual calls handled in a cell at the same time is reduced by the number of requests for location information of mobile subscriber stations in said cell.

OBJECT OF THE INVENTION

In view of the above-described disadvantages, it is the object of the present invention to minimize the consumption of resources in the network.

SOLUTION OF THE OBJECT

This object is solved by a telecommunication system for providing a call between a first subscriber station and a second subscriber station wherein said first subscriber station is a mobile subscriber station which is connected to a first mobile radio telecommunication network, comprising location information extracting means for extracting location information indicating a current location of said first mobile subscriber station in said first mobile radio telecommunication network from network information available in said first mobile radio telecommunication network and location information providing means for providing said location information to said second subscriber station in response to a request requesting said location information.

Thus, the advantage is that the request for location information concerning a mobile subscriber station does not occupy network resources.

In an embodiment of the present invention said second subscriber station is connected to said first mobile radio telecommunication network or a switched telephone network connected to said first mobile radio telecommunication network or a second mobile radio telecommunication network connected to said first mobile radio telecommunication network.

A further embodiment of the present invention comprises blocking means for disabling said location information providing means from providing said location information of said first subscriber station to said second subscriber station.

A further embodiment of the present invention comprises geographical area determining means for determining whether said first subscriber station is located within a predetermined geographical area.

A further embodiment of the present invention comprises routing means for routing a call set-up request to said first subscriber station based on the determining result from said geographical area determining means to set-up a call between said first subscriber station and said second subscriber station.

In a further embodiment of the present invention said first and second mobile radio telecommunication network are part of a global system for mobile communication GSM and said switched telephone network is an integrated services digital network ISDN or any other data network.

In a further embodiment of the present invention said network information available in said first mobile radio telecommunication network indicates a location of a switching center of said first mobile radio telecommunication network or a data base associated with said switching center or a radio cell in which said first subscriber station is located.

A further embodiment of the present invention comprises location information translating means for translating said location information into geographical information.

In a further embodiment of the present invention said information location translating means is adapted to translate said location information into full text or into a map of a relevant geographical area indicating said current location of that first subscriber station.

The object of the present invention is further solved by a method for setting-up a call in a telecommunication system between a first subscriber station and a second subscriber station, wherein said first subscriber station is a mobile subscriber station which is connected to a first mobile radio telecommunication network, comprising the steps of receiving a request for obtaining location information concerning said first subscriber station from said second subscriber station, extracting location information indicating a current location of said first subscriber station from network information available in said first mobile radio telecommunication network and providing said extracted location information to said second subscriber station.

An embodiment of the inventive method further comprises a step of determining whether said first subscriber station is located within a predetermined geographical area based on said location information, and setting-up a call between said first subscriber station and said second subscriber station if said mobile subscriber station is within said predetermined geographical area.

A further embodiment of the inventive method comprises a step of disabling the provision of said location information to said second subscriber station.

A further embodiment of the inventive method comprises the step of translating said location information into geographical information.

The object of the present invention is further solved by switching means of a mobile telecommunication system for providing a call between a first subscriber station and a second subscriber station wherein said first subscriber station is a mobile subscriber station which is connected to a first mobile radio telecommunication network, comprising location information extracting means for extracting location information indicating a current location of said first subscriber station in said first mobile radio telecommunication network from network information available in said first mobile radio telecommunication network and location information providing means for providing said location information concerning said first subscriber station to said second subscriber station in response to a request requesting said location information.

In an embodiment of the inventive switching means said second subscriber station is connected to said first mobile radio telecommunication network or a switched telephone network connected to said first mobile radio telecommunication network or a second mobile radio telecommunication network connected to said first mobile radio telecommunication network.

A further embodiment of the inventive switching means comprises blocking means for disabling said location information providing means from providing said location information of said first subscriber station to said second subscriber station.

A further embodiment of the inventive switching means comprises geographical area determining means for determining whether said first subscriber station is located within a predetermined geographical area.

A further embodiment of the inventive switching means comprises a routing means for routing a call set-up request to said first subscriber station based on the determining result from said geographical area determining means to set-up a call between said first subscriber station and said second subscriber station.

In a further embodiment of the inventive switching means said first and second mobile radio telecommunication networks are a part of a global system for mobile communications GSM and said switched telephone network is an integrated services digital network ISDN or any other data network.

In a further embodiment of the inventive switching means said network information available in said first mobile radio telecommunication network indicates a location of a switching center of said first mobile radio telecommunication network or a database associated with said switching center or a radio cell in which said first subscriber station is located.

In a further embodiment said inventive switching means comprises location information translating means for translating said location information into geographical information.

In a further embodiment of the inventive switching means, said information location translating means is translating said location information into full text or into a map of a relevant geographical area indicating said current location of said first subscriber station.

In a further embodiment said inventive switching means is a gateway mobile switching center GMSC in a GSM network.

Further advantageous embodiments and improvements of the invention become apparent from the dependent claims.

BRIEF DESCRIPTION OF THE DRAWINGS

The invention and advantages achievable by the invention are more fully disclosed and understood from preferred embodiments of the invention which are described hereinafter with respect to the accompanying drawings.

In the drawings.

First Embodiment (Location Information Retrieval)

Figure 1:
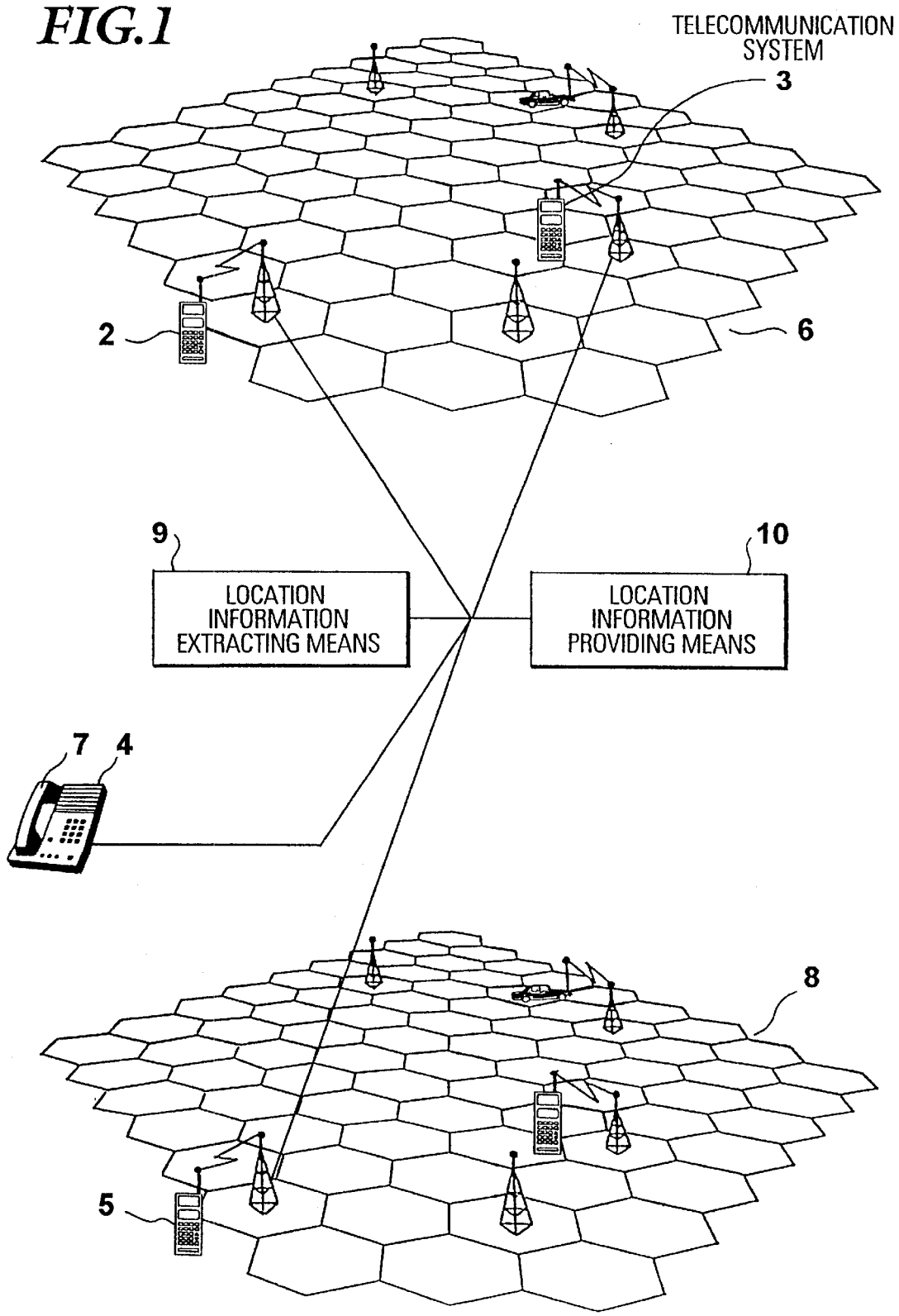
FIG. 1 shows a first embodiment of the telecommunication system for providing a call connection between a first subscriber station and a second subscriber station according to the present invention.

FIG. 1 shows a first embodiment of the telecommunication system for providing a call connection between a first subscriber station and a second subscriber station according to the present invention. Reference nummeral 2 designates a first mobile subscriber station. The first mobile subscriber station 2 and a second mobile subscriber station 3 are connected to a first mobile radio telecommunication network 6. A third mobile subscriber station 5 is connected to a second mobile radio telecommunication network 8. A fourth subscriber station 4 is connected to a switched telephone network 7. Details concerning the immediate arrangement of the networks are omitted in FIG. 1 for the sake of clarity. The telecommunication system according to the first embodiment of the present invention further comprises location information extracting means 9 and location information providing means 10. The first and the second mobile radio telecommunication networks 6 and 8, the switched telephone network 7, the location information extracting means 9 and the location information providing means 10 are connected to each other. Although FIG. 1 shows the usage of the location information extracting means with reference to two networks, the invention is not limited to the use of networks and is fully operable with one network only (as explained below).

The first and second mobile radio telecommunication networks 6 and 8 can be any kind of Public or Private Land Mobile Networks PLMN or a part of the Global System for Mobile Communications GSM. The switched telephone network 7 can be a Public Switched Telephone Network PSTN, an Integrated Services Digital Network ISDN or any other Data Network.

The location information providing means 10 and the location information extracting means 9 are preferably arranged in a switching means in said first mobile radio telecommunication network 6.

It has to be noted that both the location information extracting means 9 and the location information providing means 10 can also be provided in other elements conventionally provided in a mobile radio telecommunication network, such as in a connecting switching center provided for the connection of said mobile radio telecommunication network to other telecommunication networks, a central database for storing subscriber related information, a management switching center for performing the switching function in charge of the management of calls or in a temporary database for temporarily storing subscriber information of subscriber stations which are registered under a management switching center for performing the switching function in charge of the management of calls connected to said temporary database or in a base station switching center provided for the communication with a mobile subscriber station.

In the following, the operation of the telecommunication system according to the first embodiment of the present invention will be described by way of example. As example, it is assumed that the fourth subscriber station 4 requests location information concerning the first mobile subscriber station 2 and sends a request for obtaining location information together with an identification of the first mobile subscriber station 2 to the location information extracting means 9. Said identifier can be the called number of the first mobile subscriber station 2, the name for which the first mobile subscriber station 2 is registered in the telecommunication system or any other identifier allowing to identify said first mobile subscriber station 2.

Upon receipt of said request for location information concerning said first mobile subscriber station 2 from said fourth subscriber station 4, the location information extracting means 9 extracts location information including a current location of said first mobile subscriber station 2 from network information available in the first mobile radio telecommunication network 6.

This network information contains a parameter indicating for example the name of the network. The network name itself can be taken as coarse location information. From the network name alone it is possible to derive for example the country in which the first mobile subscriber station is currently located. A1 indicates for example Austria, D1 or D2 Germany and I TIM or I OMNITEL Italy. This parameter may further indicate a location of a specific radio cell or service area in which the first mobile subscriber station 2 is currently located or the respective switching center or radio transceiver station currently serving said first mobile subscriber station 2. Said respective switching center may be the connecting switching center, or the management switching center. This parameter can also indicate the location of the temporary database or base station switching center currently serving the mobile subscriber station in question.

The extracted location information is then forwarded to said location information providing means 10 and provided to said fourth subscriber station 4.

Instead of said fourth subscriber station 4 sending said request to the location information extracting means 9 causing said location information extracting means 9 to extract location information, it is also possible in a variant of the first embodiment said fourth subscriber station 4 sends said request to the location information providing means. In this variant, the location information providing means 10 accesses the location information extraction means 9, which in turn extract said location information from network information w which is available in the telecommunication system or the first mobile radio telecommunication network 6 and provides the extracted location information to the location information providing means 10. Then, said location information providing means 10 provides the extracted location information to the fourth subscriber station 4.

In a further variant of the first embodiment, said location information providing means 10 comprises a location information storage. If said location information is stored in said location information storage, the location information extracting means 9 can be adapted to provide extracted location information to said location information providing means 10 on a regular basis, to specific times or if said location information is changing. The location information providing means 10 may then provide said extracted location information directly to said fourth subscriber station 4 after having received a request therefrom.

In case that the second mobile subscriber station 3 or the third mobile subscriber station 4 requests location information concerning the first mobile subscriber station 2, the operation of the telecommunication system is the same as described above with respect to the fourth subscriber station 4 and the first mobile subscriber station 2.

As already indicated above, it has to be noted that for the provision of location information concerning the first mobile subscriber station 2 to the second mobile subscriber station 3, the provision of the switched telephone system 7 and the second mobile radio telecommunication network 8 respectively comprising the fourth subscriber station 4 and the third mobile subscriber station 5 is not necessary. If the fourth subscriber station 4 requests location information concerning the first mobile subscriber station 2 or the second mobile subscriber station 3, the second mobile radio telecommunication network 8 can be omitted. In case the third mobile subscriber station 5 is requesting location information concerning the first mobile subscriber station 2 or the second mobile subscriber station 3, the switched telephone network 7 comprising the fourth subscriber station 4 can be omitted.

As described above, since principally no radio path is established between the first mobile subscriber station 2, i.e. the mobile subscriber station in question and the fourth subscriber station 4, i.e. the requesting subscriber station for the provision of location information concerning said mobile subscriber station in question to said requesting subscriber station, the object of minimizing the consumption of resources is obtained.

Second Embodiment

Figure 2:
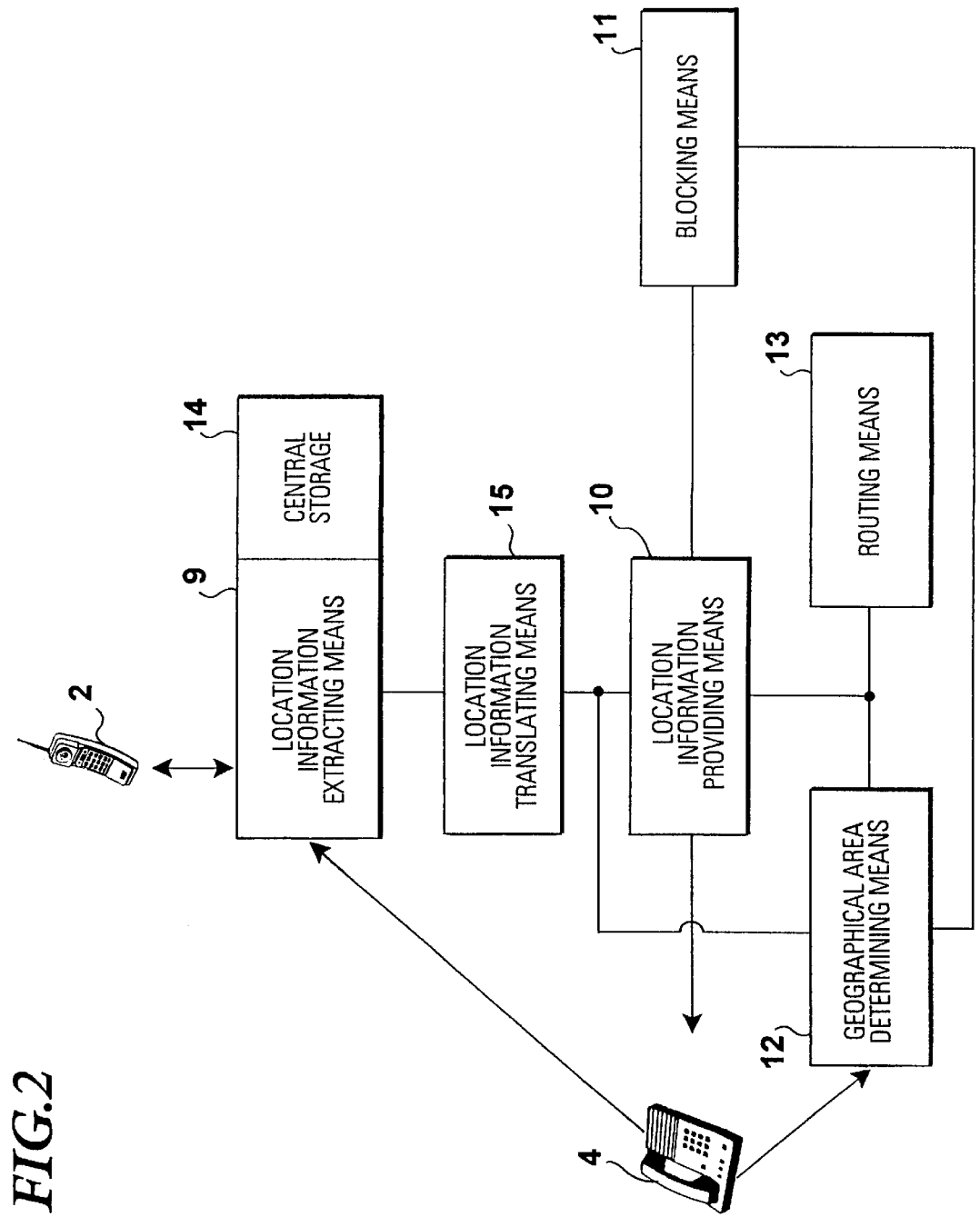
FIG. 2 shows a second embodiment of the telecommunication system for providing a call connection between a first subscriber station and a second subscriber station according to the present invention.
Figure 3A:
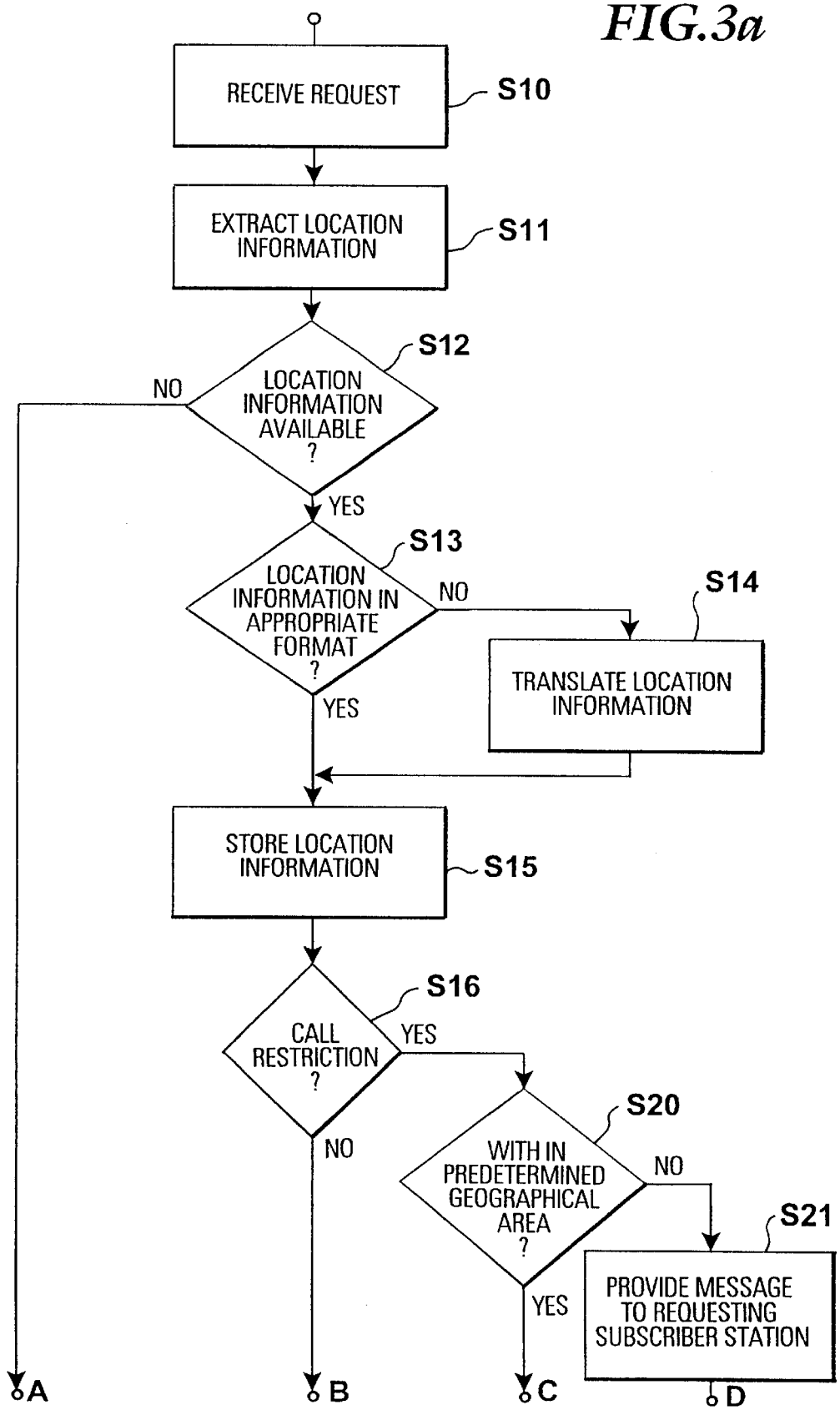
FIGS. 3a,b show a flow chart illustrating an operation of the second embodiment of FIG. 2 for providing a call connection between a first subscriber station and a second subscriber station according to the present invention.
Figure 3B:
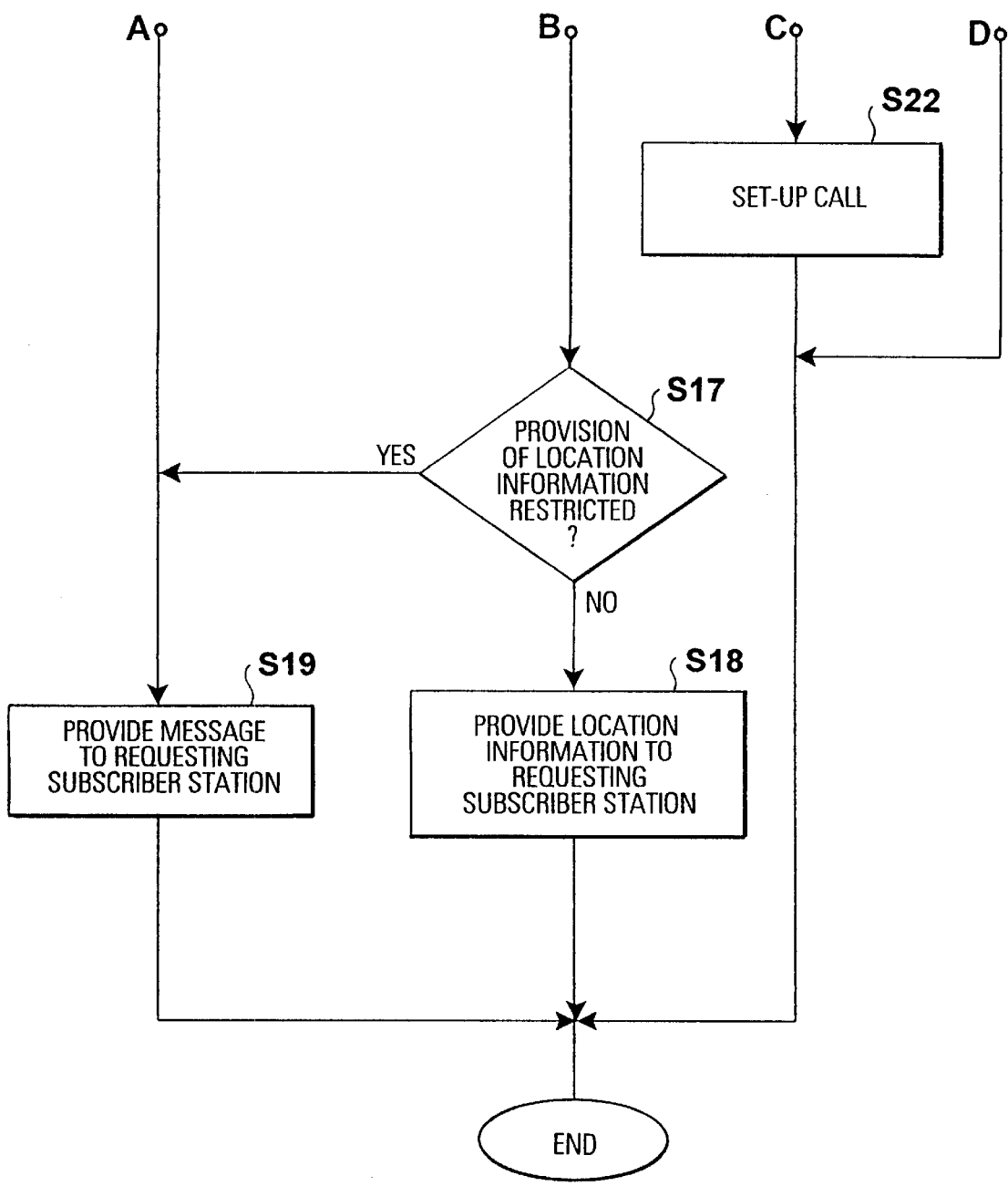

FIGS. 2 and 3 are showing a second embodiment of the telecommunication system for providing a call connection between a first subscriber station and a second subscriber station according to the present invention.

The arrangement of the subscriber stations 2, 3, 4 and 5, the first and second mobile radio telecommunication networks 6 and 8, of the switched telephone network 7, of the location information extracting means 9 and of the location information providing means 10 is similar to the arrangement of the first embodiment described with reference to FIG. 1. In FIG. 2, details concerning the telecommunication networks 6, 7 and 8 have been omitted for the shake of clarity of illustration.

In FIG. 2, the second embodiment of the present invention is depicted in the case that the fourth subscriber station 4 requests location information concerning the first mobile subscriber station 2. Instead of the fourth subscriber station 4 requesting said location information it is also possible that the second mobile subscriber station 3 or the third mobile subscriber station 5 requests said location information without causing changes to the arrangement depicted in FIG. 2.

All elements depicted in FIG. 2 except for the first mobile subscriber station 2 and the fourth subscriber station 4 are preferably included in a switching center in the, telecommunication system. Said switching center is preferably a switching center of said first mobile radio telecommunication network 6.

If it is assumed that the first mobile radio telecommunication system comprising said first mobile subscriber station 2 is a GSM network, said connecting switching center described in the first embodiment is equivalent to the gateway mobile switching center GMSC in GSM, the central database is equivalent to the home location register HLR in GSM, the management switching center is equivalent to the mobile switching center MSC in GSM, the temporary database is equivalent to the visitor location register VLR in GSM, and the base station switching center is a switching center in the base station sub-system, BSS. Then, all elements depicted in FIG. 2 except for the first mobile subscriber station 2 and the fourth subscriber station 4 are preferably arranged in the gateway mobile switching center GMSC or in the home location register HLR. However, for adapting the principle of the present invention to the architecture of a particular GSM network or to another network with a similar architecture, it is also possible that the elements depicted in FIG. 2, except for the first mobile subscriber station 2 and the fourth subscriber station 4, are individually arranged in the gateway mobile switching center GMSC, the home location register HLR, the visitor location register VLR, the mobile switching center MSC or a switching center in the base station sub-system BSS.

In FIG. 2, elements similar to elements described with reference to FIG. 1 are designated with the same reference numbers and a description thereof is omitted. FIG. 2 depicts a first mobile subscriber station 2, a fourth subscriber station 4, location information extracting means 9, location information providing means 10 and blocking means 11 for disabling said location information providing means 10 from providing said location information of said first mobile subscriber station 2 to said fourth subscriber station 4. Said blocking means 11 are activated to prevent the provision of location information to the fourth subscriber station 4 or deactivated to allow the provision of location information to the fourth subscriber station 4 by the first mobile subscriber station 2. This arrangement allows the first mobile subscriber station 2 to prevent that location information concerning said first mobile subscriber station 2 is provided to the fourth subscriber station 4. In a variant of said second embodiment, said blocking means 11 can be activated to prevent the provision of location information or deactivated by the telecommunication system as a special service for the customers, i.e. for the users of the system or by the first mobile subscriber station 2.

FIG. 2 further depicts geographical area determining means 12 for determining whether said first mobile subscriber station 2 is located within a predetermined geographical area. In a variant of said second embodiment, said telecommunication system, said first mobile subscriber station 2 or said fourth subscriber station 4 are provided with means for defining a predetermined geographical area. Then, said predetermined geographical area can be defined by the telecommunication system itself or by a user of said first mobile subscriber station 2 or by a user of said fourth subscriber station 4 which requests said location information.

In case said predetermined geographical area is defined by said means for defining a predetermined geographical area in the first mobile subscriber station 2, it may be allowed to provide location information indicating the current location of the first mobile subscriber station 2 to the requesting subscriber station 4 only if said first mobile subscriber station 2 is in said predetermined geographical area. If it is located outside said predetermined geographical area, no location information is provided to the requesting fourth subscriber station 4. Instead, in a further variant of said second embodiment, message providing means can be provided in said location information providing means 10 or said geographical area determining means 12 to provide a message to the requesting fourth subscriber station 4 indicating that said first mobile subscriber station 2 is located outside said predetermined geographical area.

It might occur that a user using said fourth subscriber station 4 is only interested in location information concerning said first mobile subscriber station 2 if said first mobile subscriber station 2 is located within a certain predetermined geographical area such as in a certain town. Then, said predetermined geographical area can be defined by means for defining a predetermined geographical area in said fourth subscriber station 4, and location information is provided only to said fourth subscriber station 4 if said first mobile subscriber station 2 is located within said predetermined geographical area, i.e. in said specific town.

By defining said predetermined geographical area by means for defining a predetermined geographical area in said telecommunication system itself, the provision of location information to a requesting subscriber station can be generally restricted to the case, the subscriber station in question is within a certain part of the telecommunication system. Said part can be a single cell, a group of cells managed by one switching center, a certain network management area or a certain mobile radio telecommunication network. Thereby, the costs arising for extracting said location information can be limited through a limited use of transmission lines. This is particularly advantageous if the following variant of the second embodiment is considered in which the location information extracting means 9 is located in the base station sub-system BSS of a GSM-network and the location information providing means is located in the gateway mobile switching center GMSC. The reasons for this are described in the following.

A requesting subscriber station—here the fourth subscriber station 4—sends the request for location information together with an identifier of the mobile subscriber station in question which is the first mobile subscriber station 2 in this example to the home-GSM-network of said mobile subscriber station in question. The home-GSM-network is the GSM-network to which said mobile subscriber station in question is subscribed. The home location register HLR in the home-GSM-network comprises all information of said mobile subscriber station in question needed for providing the telecommunication service. It further comprises additional information concerning at least the address of the visitor location register VLR or the mobile switching center MSC serving the area in which the mobile subscriber station in question is currently located. In the worst case, the home location register HLR in the home-GSM-network comprises solely an address of another GSM network if the mobile subscriber station in question is roaming in said other GSM network. This worst case is discussed in the following.

Upon receipt of the request for location information, the location information providing means in the gateway mobile switching center GMSC of the home-GSM network contacts the home location register HLR in the home-GSM network to receive information concerning which visitor location register VLR mobile switching center MSC or GSM network is to be contacted next. Then, in the case, the mobile subscriber station in question is roaming in said other GSM network, the gateway mobile switching center GMSC in the home-GSM network contacts the gateway mobile switching center GMSC of said other GSM network. Then, the gateway mobile switching center GMSC of said other GSM network contacts the respective home location register HLR to obtain information concerning the respective visitor location register VLR or mobile switching center MSC to contact next. Then, this gateway mobile switching center GMSC contacts the respective visitor location register VLR or mobile switching center which indicates the respective switching center in the base station sub-system BSS comprising said location information extracting means. By restricting, e.g. the location information provision to the case, when the mobile subscriber station in question is located within the home-GSM network, the signalling load described above can be avoided and the cost arising for the grasping of the location information can be limited.

FIG. 2 further depicts routing means 13 which are arranged for routing a call set-up request to said first mobile subscriber station 2 based on the determining result from said geographical area determining means 12 to set-up a call between said first mobile subscriber station 2 and said fourth subscriber station 4. Said routing means are adapted to set-up a call only if said geographical area determining means determines that the first mobile subscriber station 2 is in said predetermined geographical area. Thus, it is possible to provide a service to a user of said fourth subscriber station 4 wherein a call to the first mobile subscriber station 2 is only possible if said first mobile subscriber station 2 is located within a certain predetermined area. This may be advantageous in order to restrict the costs occurring for a call.

FIG. 2 further depicts location information translating means 15 for translating said location information extracted by said location information extracting means 9 into geographical information. The location information translating means 15 can be adapted to translate location information into full text describing the geographical location of said first mobile subscriber station 2 in the telecommunication system or into a map of a relevant geographical area indicating said current location.

FIG. 2 further depicts a central storage 14 which is provided for storing location information extracted by the location information extracting means 9. Thus, location information extracted by said location information extracting means 9 can be stored centrally. Said location information stored in said central storage 14 can be updated on a regular basis or can be updated, if the location information concerning said first mobile subscriber station 2 changes by means of said location information extracting means 9. With this arrangement, the time needed for providing location information to said requesting fourth subscriber station 4 can be reduced significantly.

In spite of being shown in conjunction with said location information extracting means 9, said central storage 14 can be also arranged in conjunction with said location information translating means 15 for storing location information which has already been translated or in conjunction with said location information providing means 10 for storing location information which is to be provided to said fourth subscriber station 4.

In the following, the operation of the second embodiment of the present invention will be described with reference to FIG. 3. FIG. 3 shows a flow chart illustrating the operation of the second embodiment of the present invention described with reference to FIG. 2.

In step 10 of the flow chart shown in FIG. 3, the location information extracting means 9 receives a request for location information concerning said first mobile subscriber station 2. Said request for location information can originate from said fourth subscriber station 4 connected to a switched telephone network 7 as shown in FIG. 1, from a second mobile subscriber station 3 which is connected to the same mobile radio telecommunication network 6 as said first mobile subscriber station 2 or a third mobile subscriber station 5 which is connected to a second mobile radio telecommunication network 8 as illustrated in FIG. 1. In step 11 said location information extracting means extracts location information from network information available in the first mobile radio telecommunication network 6. Said network information contains a parameter indicating for example a name of the first mobile radio telecommunication network 6 itself. This parameter may further indicate more specific information concerning the location of said first mobile subscriber station 2 such as the location of the switching center or the database being assigned to the plurality of cells in which said first mobile subscriber station 2 is located. Said parameter may also indicate the location of the specific cell or radio transmitter which is in contact with said first mobile subscriber station 2.

This parameter can have the format of a number which is assigned to the respective element above, but can also be the name of the city or area in which this element is located.

If the parameter has the format of a number, it can easily be translated into a term which is meaningful to a lay person by means of a look-up table.

In step 12 it is determined whether location information concerning said first mobile subscriber station 2 is available. This is preferably performed by the location information extracting means 9 or said location information providing means 12 but can also be performed by any other of said elements depicted in FIG. 2 except for the subscriber stations 2 and 4. In a case that no location information is available, the operation proceeds to step 19 and a message is sent to the requesting subscriber station, which in this example is the fourth subscriber station 4, this message indicating that no location information can be provided or that the first mobile subscriber station 2 is not available. The message is preferably sent by the location information providing means 9. Such a case occurs for example if the mobile subscriber station in question is switched off. If it is determined in step 12, that location information concerning said first mobile subscriber station is available, the operation proceeds to step 13.

In step 13 it is determined whether the location information is in an appropriate format to be provided to said requesting subscriber station. For example location information which contains a number of the respective cell of the first mobile radio telecommunication in which the first subscriber station is located only is inappropriate for a user who is not aware of the specific numbering of these cells. This is preferably performed by said location information translating means 15 but can also be performed by said location information extracting means 9. If it is determined in step 13 that said location information is not in an appropriate format, that is in a format which cannot be easily understood by a user, the operation proceeds to step 14 wherein said location information is translated into full text or geographical information relating to a map of a relevant geographical area indicating said current location. If the location information is translated or if it has been determined in step 13 that the location information is already in an appropriate format to be provided to the fourth subscriber station 4, the operation proceeds to step 15 wherein the location information to be provided to the fourth subscriber station 4 is stored in the central storage 14. It has to be noted that said storing step can also be performed directly after the extraction of said location information in step 11 or directly after the translation of said location information in step 14. Then, the operation proceeds to step 16.

In step 16 it is determined whether a call restriction is activated or not. This is preferably performed by said routing means 13. If the call restriction is activated, said routing means 13 routes a call connection to the first mobile subscriber station 2 only if said geographical area determining means 12 determines that said first mobile subscriber station 2 is located in the predetermined geographical area. Therefore, it is determined in step 20 whether said first mobile subscriber station 2 is located within said predetermined geographical area. As already noted above, this predetermined geographical area can be determined by the requesting subscriber station, that is in this example, the fourth subscriber station 4, by the first mobile subscriber station 2 or by the telecommunication system itself, respectively comprising means for defining a predetermined geographical area. If said first mobile subscriber station 2 is located outside said predetermined geographical area, the operation proceeds to step 21 wherein a message is provided to the requesting subscriber station that said first mobile subscriber station 2 is located outside said predetermined geographical area or is not available. If it determined in step 20, that said first mobile subscriber station 2 is located in said predetermined geographical area, said routing means 13 sets-up a call to said first mobile subscriber station 2 in step S22.

If it has been determined in step 16 that the call restriction is deactivated, the operation proceeds to step 17 wherein it is determined whether said provision of the location information to the requesting subscriber station, that is the fourth subscriber station 4 in this example, is blocked. If the provision of location information is not blocked or disabled by said blocking means 11, the operation proceeds to step 18 and the location information is provided to said requesting subscriber station, i.e. to the fourth subscriber station 4 in this example. The user of said requesting subscriber station may then decide whether to call said first mobile subscriber station or not. If it is determined in step 17 that the provision of location information is blocked, the operation proceeds to step 19 and said location information providing means 9 sends a message such as "no location information available" or "provision of location information blocked" to said requesting subscriber station.

It has to be noted that the above described operation can be performed either prior to a set-up of a call connection, during the set-up of a call connection or during an ongoing call connection. In case that the above operation is performed during an ongoing call connection, step 16 can be omitted. In case that the above operation is performed during the set-up of a call connection, step 22 is replaced by a step wherein a message is sent to the requesting subscriber station indicating that said first mobile subscriber station 2 is within said predetermined geographical area. This message is preferably sent by said location information providing means 9.

Third Embodiment (Application in a GSM Network)

In the following, a third embodiment of the present invention will be described with reference to FIG. 4. In this third embodiment of the present invention, the principle of the invention disclosed in conjunction with the first and the second embodiment is applied on a global system for mobile communications GSM.

Every mobile radio telecommunication system includes a central database (e.g. the HLR in a GSM-network) containing a variety of information concerning a subscriber, such as the subscription limitations, the services subscribed for, the states of the supplementary service activation, or the information needed for the management of the charging information. In a GSM network, the same information exists, plus information which is specific, such as the information related to confidentiality functions.

The goal of each telecommunication system as far as location management is concerned, is to prepare for the routing of calls towards the mobile subscriber stations, taking account of their movements. To that end, the network must memorize for each subscriber (in the GSM for each SIM) whether he is known to be in some place or not (he is said to be registered), and if so, in which location. This network information has to be at least sufficient for routing a call up to a management switching center serving the respective mobile subscriber station, i.e. the mobile switching center MSC in a GSM network which will be in charge of the communication, i.e. the call.

In addition to that, in most telecommunication systems (also in GSM) there is the knowledge of more accurate network information concerning a location of a mobile subscriber station in order to restrict the paging to location areas which are geographically restricted.

The principle of the present invention is now to extract location information from network information already available in the telecommunication system indicating a location of a particular mobile subscriber station and to provide this extracted location information to a requesting subscriber station requesting said location information of said mobile subscriber station. Then, a user of said requesting subscriber station is enabled to decide whether to call the mobile subscriber station based on said location information.

As already mentioned above, a mobile radio telecommunication system according to the GSM standard comprises a gateway mobile switching center GMSC which is equivalent to the connecting switching center describe with reference to the first embodiment of the invention, to link it to other networks such as switched telephone networks like an integrated services digital network ISDN or a data network. The GMSC is connected to the home location register HLR wherein two types of information are stored: Subscriber information and mobile information to allow incoming calls to be routed to the mobile subscriber station. This mobile information indicates at least a location of the mobile switching center MSC serving the specific cell in which the mobile subscriber station is currently located. Any administrative action by the network operator with respect to mobile station data is carried out in the home location register HLR.

If a mobile subscriber station roams from one location area (group of cells) to another, said delocation process is registered by the MSC and the information thereon is stored in a visitor location register VLR or kept in the MSC. If the mobile subscriber station is roaming out of a location area constituted by a group of cells, the respective mobile switching center MSC signals said change to the respective home location register HLR to which the respective mobile subscriber station belongs. If a new mobile subscriber station enters a location area, the respective MSC signals to the respective home location register HLR that it is now the mobile switching center MSC in charge for establishing a communication, i.e. call connections with this new mobile subscriber station.

Accordingly, the home location register HLR comprises at least network information concerning the location area or the mobile switching center MSC currently serving a respective mobile subscriber station. This network information can be a physical address in the network or the location thereof such as the name of the area or of a nearby town. The physical address can be easily translated into location information appropriate for a user by means of a look-up table.

Figure 4:
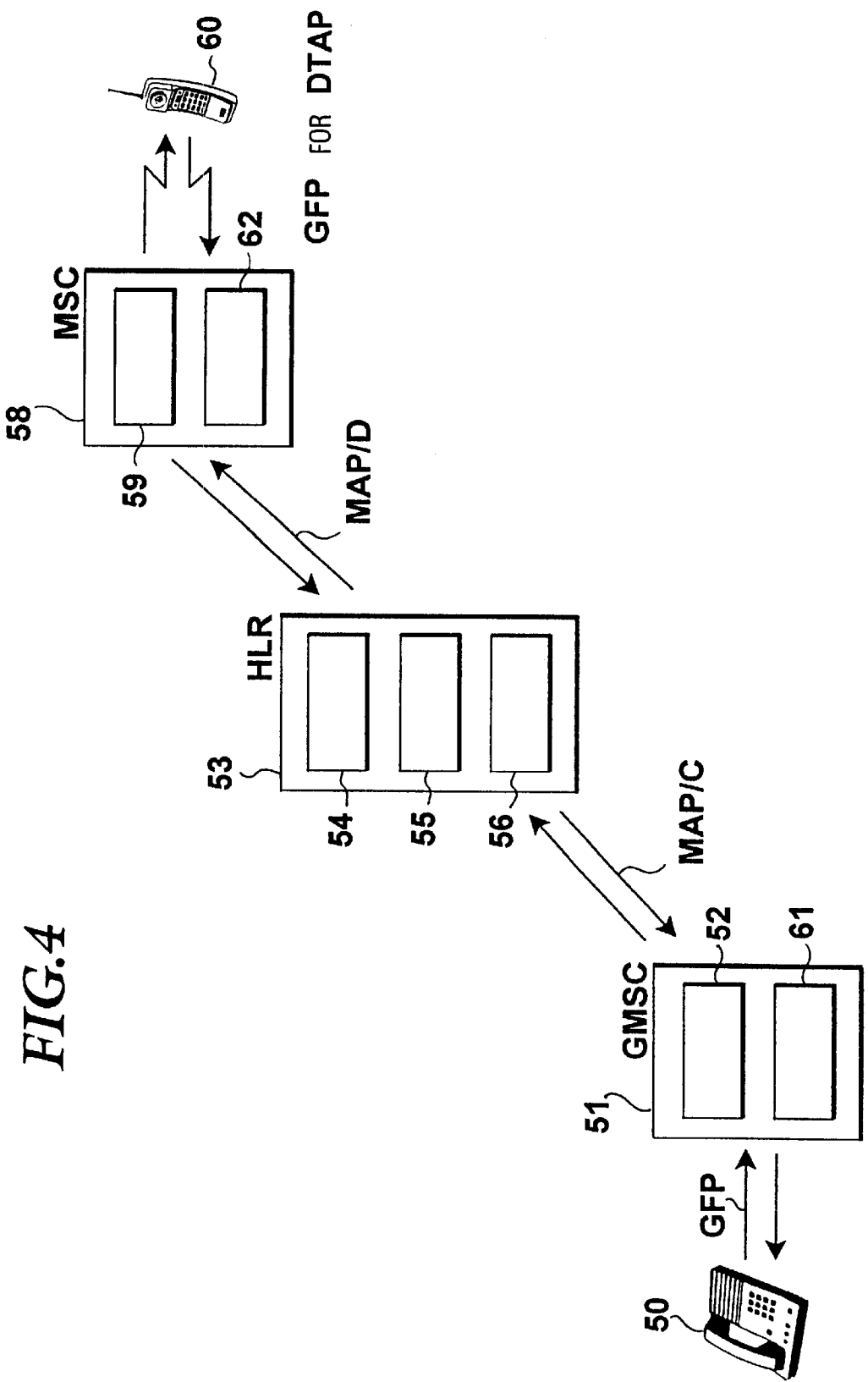
FIG. 4 shows a third embodiment of the telecommunication system m for providing a call connection between a first subscriber station and a second subscriber station according to the present invention.
Figure 5:
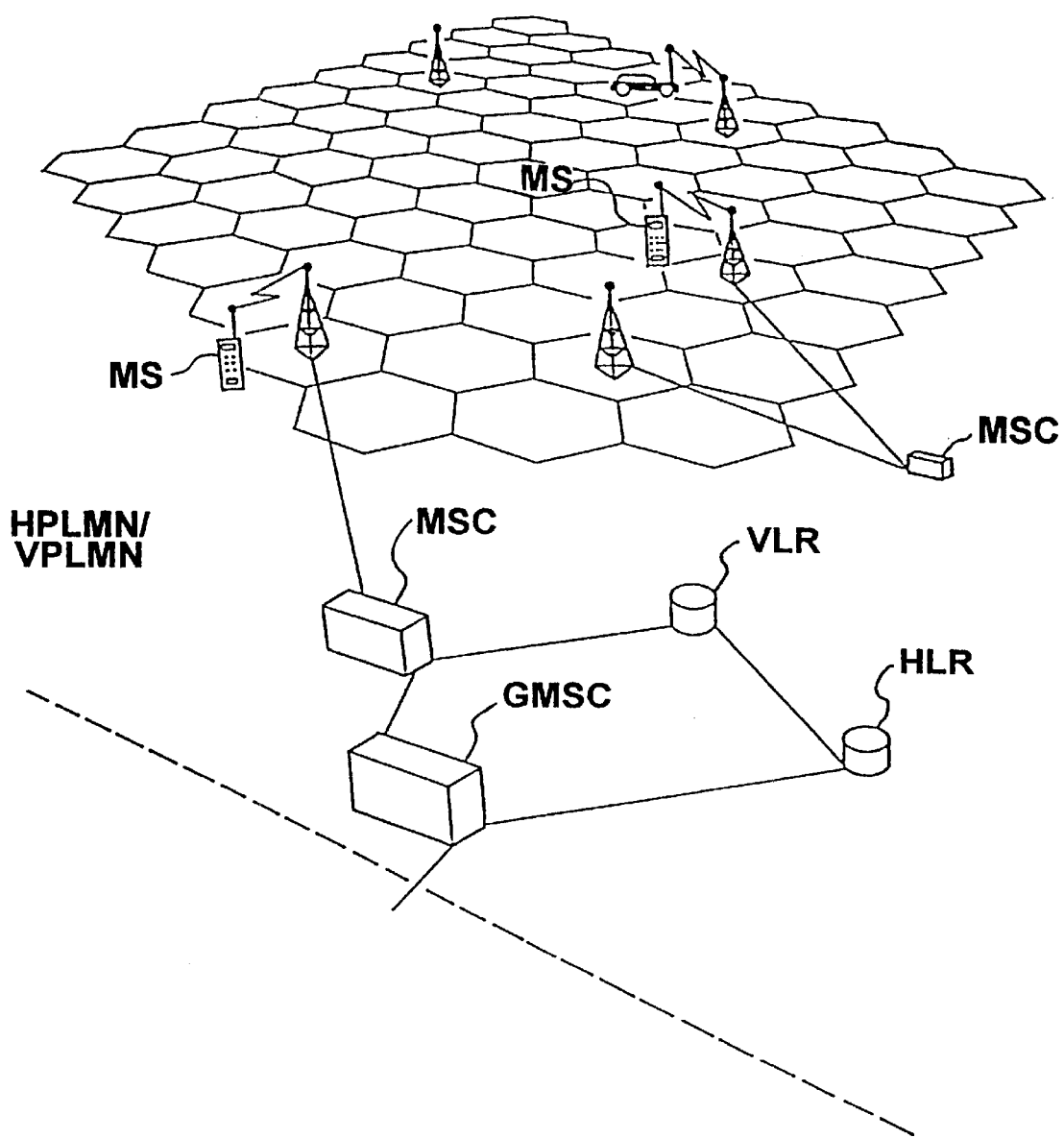
FIG. 5 shows a basic structure of a conventional GSM-network.

FIG. 4 shows a simplified arrangement of the third embodiment of the present invention wherein firstly a subscriber 50 within the integrated services digital network ISDN requests location information of a mobile subscriber station within a GSM network prior to an actual call set-up and secondly a mobile subscriber station 60 within a GSM network requests the location information of another mobile subscriber station subscribed to the same GSM network.

The subscriber station 50 within the integrated services network ISDN sends a request for location information together with an identifier for identifying the mobile subscriber station in question to the gateway mobile switching center GMSC 51 of the GSM mobile radio telecommunication network. This transmission can be implemented by extending the generic functional protocol GFP by a dedicated location information procedure, using connectionless signaling services. If the requesting subscriber station has not subscribed for a service allowing him to request location information on a specific mobile subscriber station, the gateway mobile switching center GMSC 51 rejects the request. Whether a request is rejected or not is determined by means of request rejecting means 61 which are arranged in said gateway mobile switching center GMSC 51. Then, a location information request interpretation means 52 in said gateway mobile switching center GMSC 51 interprets the incoming location information request and forwards the location information request to the home location register HLR 53. The signaling between the gateway mobile switching center GMSC and the home location register 53 is based on the Mobile Application Part C (MAP/C) signaling protocol whose capabilities have to be extended to support such a functionality. Upon receipt of such a request, a location information extracting means 54 arranged in that home location register HLR 53 extracts location information including a current location of the mobile subscriber station in question from network information s stored in the home location register HLR 53. Said network information can relate for example to a mobile station roaming number MSRN which is the routing number used on a second leg of an incoming call between the gateway mobile switching center GMSC and the visited mobile subscriber station in the GSM mobile radio telecommunication system. The visited mobile switching center MSC is the mobile switching center MSC in which area the respective mobile subscriber station is currently located.

The format of the location information extracted by said location information extracting means 54 from said network information is usually not appropriate for an end-user who is not aware of the architecture of the GSM mobile radio telecommunication network, that is, it is in a format from which the end-user cannot directly derive the loction of the subscriber station in question. Accordingly, there is provided a location information translating means 55 for translating said location information into full text or geographical information relating to a map of a relevant geographical area indicating the current location of the mobile subscriber station in question. This translation can be implemented by mapping the location information of the mobile subscriber station in question by means of a simple translation table. In case, the location area information LAI and the cell global identity CGI are used which are conventionally provided in a GSM network as specified by the GSM recommendations, the location information can simply be translated into the name of the city or area indicated by the LAI/CGI. In case, the MSRN is used, the name of the city or area in which the respective MSC is located can be used in order to translate said location information. Then, said translated location information is transmitted to the gateway mobile switching center GMSC by means of location information providing means 56 located in the home location register VLR 53. This can be done by using the extended MAP/C-signaling protocol. The gateway mobile switching center GMSC 51 issues a location information response which is then transported to the requesting subscriber 50 via the generic functional protocol GFP.

In the following, there will be described a case in which a mobile subscriber station within a GSM mobile radio telecommunication system requests location information of another mobile subscriber station subscribed to the same GSM mobile radio telecommunication system. The signaling protocol used for the communication between the mobile switching center MSC 58 and the requesting mobile subscriber station 60 is the generic functional protocol GFP which is extended by a dedicated location information procedure using connectionless signaling services. The generic functional protocol GFP is available for the Direct Transfer Application Part (DTAP) signaling protocol. The requesting mobile subscriber station 60 sends a request for location information together with an identifier such as the calling party number of the mobile subscriber station in question to the mobile switching center MSC 58. If the requesting subscriber station has not subscribed to a service, allowing him to request location information, request rejecting means 62 arranged in the mobile switching center MSC 58 rejects said request. The mobile switching center MSC 58 comprises location information request identification means 59 which identify the request for location information and forwards the request to the home location register HLR 53 using the mobile application part MAP/D signaling protocol which capabilities have been expanded in order to support such a functionality. The operation performed in the home location register HLR 53 in the case, that a mobile subscriber station 60 requests location information concerning another mobile subscriber station in the same GSM mobile radio telecommunication network is the same as in the case, a subscriber within the integrated services digital network ISDN request location information concerning a mobile subscriber station within a GSM radio mobile telecommunication network as described above. Accordingly, a description thereon can be omitted. The extracted and translated location information is then transmitted back to the mobile switching center MSC 58 by means of said location information providing means 56 using the Mobile Application Part D (MAP/D) signaling protocol.

In an improvement of the third embodiment shown in FIG. 4, there can be provided blocking means 57 for disabling said location information providing means 56 from providing said location information of said mobile subscriber station in question to the requesting subscriber station 50 or the requesting mobile subscriber station 60. As described with reference to FIG. 2, said blocking means are activated/deactivated by the subscriber concerning which location information is requested. However, in a variant of this improvement of the third embodiment said blocking means are activated/deactivated by the GSM mobile radio telecommunication network. This can be done as a special service for the users.

In none of the above embodiments, it is necessary to establish a radio path to the mobile subscriber station of

What is claimed is:

1. Telecommunication system for providing a call between a first subscriber station (2) and a second subscriber station (3,4,5) wherein the first subscriber station is a mobile subscriber station which is connected to a first mobile radio telecommunication network (6), comprising:
   location information extracting means (9) for extracting location information indicating a current location of the first mobile subscriber station (2) in the first mobile radio telecommunication network (6) from network information available in the first mobile radio telecommunication network (6);
   location information providing means (10) for providing said location information to the second subscriber station (3,4,5) in response to a request requesting said location information;
   geographical area determining means (12) for determining whether the first subscriber station is located within a predetermined geographical area; and
   routing means (13) for routing a call set-up request to the first subscriber station to set up a call between the first subscriber station (2) and the second subscriber station (3) only if the first subscriber station is within the predetermined geographical area.

2. Telecommunication system according to claim 1, further comprising
   blocking means (11) for disabling said location information providing means (10) from providing said location information of the first subscriber station (2) to the second subscriber station (3,4,5).

3. Telecommunication system according to claim 1, wherein
   said network information available in the first mobile radio telecommunication network (6) indicates a location of one of the group consisting of a switching center of the first mobile radio telecommunication network (6), a data base associated with said switching center and a radio cell in which the first subscriber station (2) is located.

4. Telecommunication system according to claim 1, wherein the predetermined geographical area is determined by one of a) the second subscriber station and b) the telecommunication system.

5. Telecommunication system according to claim 1, wherein one of a) the second subscriber station and b) the telecommunication system including means for defining the predetermined geographical area.

6. Telecommunication system for providing a call between a first subscriber station (2) and a second subscriber station (3,4,5) wherein the first subscriber station is a mobile subscriber station which is connected to a first mobile radio telecommunication network (6), comprising:
   location information extracting means (9) for extracting location information indicating a current location of the first mobile subscriber station (2) in the first mobile radio telecommunication network (6) from network information available in the first mobile radio telecommunication network (6);
   location information providing means (1) for providing said location information to the second subscriber station (3,4,5) in response to a request requesting said location information;
   location information translating means (15) for translating said location information into geographical information;
   geographical area determining means (12) for determining whether the first subscriber station (2) is located within a predetermined geographical area; and
   routing means (13) for routing a call set-up request to the first subscriber station to set up a call between the first subscriber station (2) and the second subscriber station (3) only if the first subscriber station is within the predetermined geographical area.

7. Telecommunication system according to claim 6, wherein
   said location information translating means (15) is translating said location information into one of a group consisting of full text and a map of a relevant geographical area
   respectively indicating the current location of the first subscriber station (2).

8. Telecommunication system according to claim 6, wherein the predetermined geographical area is determined by one of a) the second subscriber station and b) the telecommunication system.

9. Telecommunication system according to claim 6, wherein one of a) the second subscriber station and b) the telecommunication system including means for defining the predetermined geographical area.

10. Telecommunication system for providing a call between a first subscriber station (2) and a second subscriber station (3,4,5) wherein the first subscriber station is a mobile subscriber station which is connected to a first mobile radio telecommunication network (6), comprising:
    location information extracting means (9) for extracting location information indicating a current location of the first mobile subscriber station (2) in the first mobile radio telecommunication network (6) from network information available in the first mobile radio telecommunication network (6);
    location information providing means (10) for providing said location information to the second subscriber station (3,4,5) in response to a request requesting said location information;
    geographical area determining means (12) for determining whether the first subscriber station (2) is located within a predetermined geographical area;
    routing means (13) for routing a call set-up request to the first subscriber station to set up a call between the first subscriber station (2) and the second subscriber station (3) only if the first subscriber station is within the predetermined geographical area; and
    the second subscriber station (3, 4, 5) being connected to one of the group consisting of the first mobile radio telecommunication network (6), a switched telephone network (7) connected to the first mobile radio telecommunication network (6), a second mobile radio telecommunication network (8) connected to the first mobile radio telecommunication network (6).

11. Telecommunication system according to claim 10, wherein
    the first and second mobile radio telecommunication networks are part of a global system for mobile communications (GSM) and the switched telephone network (7) is one of the group consisting of an integrated services digital network (ISDN) and a data network.

12. Telecommunication system according to claim 10, wherein the predetermined geographical area by one of a) the second subscriber station and b) the telecommunication system.

13. Telecommunication system according to claim 10, wherein one of a) the second subscriber station and b) the telecommunication system including means for defining the predetermined geographical area.

14. Method for setting-up a call in a telecommunication system between a first subscriber station and a second subscriber station, wherein the first subscriber station is a mobile subscriber station which is connected to a first mobile radio telecommunication network, comprising the steps of:

receiving a request for obtaining location information (S10) concerning the first subscriber information from the second subscriber station;

extracting location information (S11) indicating a current location of the first subscriber station from network information available in the first mobile radio telecommunication network;

determining whether the first subscriber station is located within a predetermined geographical area; and routing a call set-up request to the first subscriber station to set-up a call between the first subscriber station and the second subscriber station only if the first subscribers station is within the predetermined geographical area.

15. Method according to claim 14, further comprising the steps of determining whether the first subscriber station is located within a predetermined geographical area (S20) based on said location information; and setting-up a call (S22) between the first subscriber station and the second subscriber station if the mobile subscriber station is within said predetermined geographical area.

16. Method according to claim 14, further comprising the step of disabling the provision of said location information to the second subscriber station (S17).

17. Method according to claim 14, further comprising the step of translating said location information into geographical information (S14).

18. Method according to claim 14, further comprising the step of determining the predetermined geographical area by one of a) the second subscriber station and b) the telecommunication system.

19. Method according to claim 14, wherein one of a) the second subscriber station and b) the telecommunication system including means for defining the predetermined geographical area.

20. Switching means of a mobile telecommunication system for providing a call between a first subscriber station (2) and a second subscriber station (3,4,5) wherein the first subscriber station is a mobile subscriber station which is connected to a first mobile radio telecommunication network (6), comprising:

location information extracting means (9) for extracting location information indicating a current location of the first subscriber station (2) in the first mobile radio telecommunication network (6) from network information available in the first mobile radio telecommunication network (6);

location information providing means (10) for providing said location information concerning the first subscriber station (2) to the second subscriber station (3,4,5) in response to a request requesting said location information;

geographical area determining means (12) for determining whether the first subscriber station (2) is located within a predetermined geographical area; and routing means (13) for routing a call set-up request to the first subscriber station to set up a call between the first subscriber station (2) and the second subscriber station (3) only if the first subscriber station is within the predetermined geographical area.

21. Switching means according to claim 20, wherein the second subscriber station (3,4,5) is connected to one of the group consisting of the first mobile radio telecommunication network (6), a switched telephone network (7) connected to the first mobile radio telecommunication network (6) and a second mobile radio telecommunication network (8) connected to the first mobile radio telecommunication network (6).

22. Switching means according to claim 20, further comprising blocking means (11) for disabling said location information providing means (10) from providing said location information of the first subscriber station (2) to the second subscriber station (3,4,5).

23. Switching means according to claim 20, wherein said network information available in the first mobile radio telecommunication network (6) indicates a location of one of a group consisting of a switching center of the mobile radio telecommunication network, a database associated with said switching center and a radio cell in which the first subscriber station is located.

24. Switching means according to claim 20, wherein the predetermined geographical area is determined by one of a) the second subscriber station and b) the telecommunication system.

25. Switching means according to claim 20, wherein one of a) the second subscriber station and b) the telecommunication system including means for defining the predetermined geographical area.

26. Switching means of a mobile telecommunication system for providing a call between a first subscriber station (2) and a second subscriber station (3,4,5) wherein the first subscriber station is a mobile subscriber station which is connected to a first mobile radio telecommunication network (6), comprising:

location information extracting means (9) for extracting location information indicating a current location of the first subscriber station (2) in the first mobile radio telecommunication network (6) from network information available in the first mobile radio telecommunication network (6);

location information providing means (10) for providing said location information concerning the first subscriber station (2) to the second subscriber station (3,4,5) in response to a request requesting said location information;

geographical area determining means (12) for determining whether the first subscriber station (2) is located within a predetermined geographical area; and routing means (13) for routing a call set-up request to the first subscriber station to set up a call between the first subscriber station (2) and the second subscriber station (3) only if the first subscriber station is within the predetermined geographical area;

the second subscriber station (3, 5, 6) being connected to one of the group consisting of the first mobile radio telecommunication network (6), a switched telephone network (7) connected to the first mobile radio telecommunication network (6) and a second mobile radio telecommunication network (8) connected to the first mobile radio telecommunication network (6); and the first and second mobile radio telecommunication networks being a part of a global system for mobile communications (GSM) and the switched telephone network (7) being one of a group consisting of an integrated services digital network (ISDN) and a data network.

27. Switching means according to claim 26, wherein said switching means is a gateway mobile switching center (GMSC) in a GSM network.

28. Switching means according to claim 26, wherein the predetermined geographical area is determined by one of a) the second subscriber station and b) the telecommunication system.

29. Switching means according to claim 26, wherein one of a) the second subscriber station and b) the telecommunication system including means for defining the predetermined geographical area.

30. Switching means of a mobile telecommunication system for providing a call between a first subscriber station (2) and a second subscriber station (3,4,5) wherein the first subscriber station is a mobile subscriber station which is connected to a first mobile radio telecommunication network (6), comprising:

location information extracting means (9) for extracting location information indicating a current location of the first subscriber station (2) in the first mobile radio telecommunication network (6) from network information available in the first mobile radio telecommunication network (6);

location information providing means (10) for providing said location information concerning the first subscriber station (2) to the second subscriber station (3,4,5) in response to a request requesting said location information;

location information translating means (15) for translating the said location information into geographical information;

geographical area determining means (12) for determining whether the first subscriber station (2) is located within a predetermined geographical area; and routing means (13) for routing a call set-up request to the first subscriber station to set up a call between the first subscriber station (2) and the second subscriber station (3) only if the first subscriber station is within the predetermined geographical area.

31. Switching means according to claim 30, wherein said information location translating means (15) is translating said location information into one of a group consisting of full text and a map of a relevant geographical area indicating said current location of the first subscriber station.

32. Switching means according to claim 30, wherein the predetermined geographical area is determined by one of a) the second subscriber station and b) the telecommunication system.

33. Switching means according to claim 30, wherein one of a) the second subscriber station and b) the telecommunication system including means for defining the predetermined geographical area.

* * * * *